(12) United States Patent
Jelmi et al.

(10) Patent No.: US 11,120,631 B2
(45) Date of Patent: Sep. 14, 2021

(54) COGNITIVE TRAINING SYSTEM

(71) Applicant: NeuroPowertrain Sàrl, Saint-Imier (CH)

(72) Inventors: Jean-Philippe Jelmi, Hauterive (CH); Thierry Müller, Peseux (CH)

(73) Assignee: Neuropowertrain Sàrl, Saint-Imier (CH)

( * ) Notice: Subject to any disclaimer, the term of this patent is extended or adjusted under 35 U.S.C. 154(b) by 0 days.

(21) Appl. No.: 16/567,759

(22) Filed: Sep. 11, 2019

(65) Prior Publication Data

US 2020/0126304 A1    Apr. 23, 2020

(30) Foreign Application Priority Data

Sep. 13, 2018 (CH) .................... 01084/18

(51) Int. Cl.
| | |
|---|---|
| *G06T 19/00* | (2011.01) |
| *G02B 27/01* | (2006.01) |
| *G06F 3/01* | (2006.01) |
| *G06F 7/58* | (2006.01) |
| *G09B 5/06* | (2006.01) |
| *G09B 19/00* | (2006.01) |

(52) U.S. Cl.
CPC .......... *G06T 19/006* (2013.01); *G02B 27/017* (2013.01); *G06F 3/011* (2013.01); *G06F 7/58* (2013.01); *G02B 2207/123* (2013.01); *G09B 5/065* (2013.01); *G09B 19/0038* (2013.01)

(58) Field of Classification Search
None
See application file for complete search history.

(56) References Cited

U.S. PATENT DOCUMENTS

| | | | | |
|---|---|---|---|---|
| 2011/0125063 | A1* | 5/2011 | Shalon | A61B 5/0006 600/590 |
| 2017/0046971 | A1* | 2/2017 | Moreno | G09B 19/00 |
| 2017/0262045 | A1* | 9/2017 | Rouvinez | G06F 3/011 |
| 2017/0336882 | A1* | 11/2017 | Tome | G06F 3/0346 |
| 2017/0361217 | A1* | 12/2017 | Burdea | A61H 1/00 |

* cited by examiner

*Primary Examiner* — YuJang Tswei
(74) *Attorney, Agent, or Firm* — Blank Rome LLP

(57) ABSTRACT

The invention concerns a cognitive training system (1) for providing a cognitive exercise. The cognitive training system comprises a head-mounted display (2) for providing a stereoscopic image (23) to a user (9). The system further comprises a controller (4) configured to control said head-mounted display (2) to provide the cognitive exercise by displaying virtual objects moving in a three-dimensional environment according to predetermined rules of motion, and by acquiring inputs provided by the user by means of an input unit (3). The cognitive training system (1) further comprises a perturbation unit (5) configured to control the head-mounted display (2) and/or the controller (4) to activate a virtual perturbation altering the appearance of the virtual objects. The perturbation unit determines the virtual perturbation based on a random or pseudorandom quantity.

10 Claims, 2 Drawing Sheets

COGNITIVE TRAINING SYSTEM

REFERENCE DATA

The present application claims priority from Swiss patent application 01084/18 of Sep. 13, 2018, the contents whereof are incorporated by reference.

FIELD OF THE INVENTION

The invention concerns a cognitive training system for permitting a user to train his cognitive functions and skills.

DESCRIPTION OF RELATED ART

In dynamic sports such as soccer, studies have proven that skilled players have better anticipation and decision-making abilities than less skilled players. These abilities, typically referred as perceptual-cognitive skills, represent the human brain's ability to extract meaningful contextual information from the visual scene of the game. For example, a skilled soccer player can know where the ball is at any moment of the game without maintaining his gaze on it.

There is thus an increased interest on cognitive training systems capable to train perceptual-cognitive skills in users, notably on professional athletes. Notably, there is an increasing interest in cognitive training system providing specific exercises developing attention, working memory and visual information processing speed for specific sports.

These specific exercises are based on three-dimensional (3D) Multiple Object Tracking (MOT) training task. This task (game) relies on displaying, on a screen, of a set of (typically 7 to 8) 3D virtual objects moving in a 3D space at different speeds, while prompting the user to track a subset of three to four virtual objects, initially identifiable by a distinct colour. After a given time interval, typically 8 seconds, the game stops and the user is prompted to select and/or indicate the virtual objects he/she was supposed to track.

BRIEF SUMMARY OF THE INVENTION

The aim of the invention is to provide a cognitive training system providing a more efficient training exercise.

According to the invention, this aim is achieved by means of the system of claim 1.

The proposed solution provides a specific cognitive exercise while simulating perturbations (typically or potentially) affecting the user when practising a given dynamic sport or activity. This solution permits to develop more valuable attentions, working memories and visual information processing speeds as they are more easily transportable and exploitable in a real practice.

It one embodiment, the system is configured to prompt the user to answer to a question or to a set of questions, each question being individually displayed on the display and/or reproduced by means of the speaker. This solution permits to complementarily and robustly assess improvements in perceptual-cognitive abilities of the user.

In another embodiment, the proposed solution comprises a self-learning machine trained to provide a new session (e.g. a new cognitive exercise, a new question exercise and/or a new perturbation) for efficacy guiding each user in training his/her perceptual-cognitive skills in an optimal way.

Moreover, in a special embodiment, the self-learning machine is trained by means of an input dataset comprising data provided by one or more reference training sessions being provided to another or other users, wherein particular positive effects have been observed and/or measured on this or these user(s). This embodiment permits to infer optimal cognitive exercise parameters and/or perturbations, notably optimal frequency and duration of training sessions, for enhancing and prolonging positive effects on the perceptual-cognitive skills of the user.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
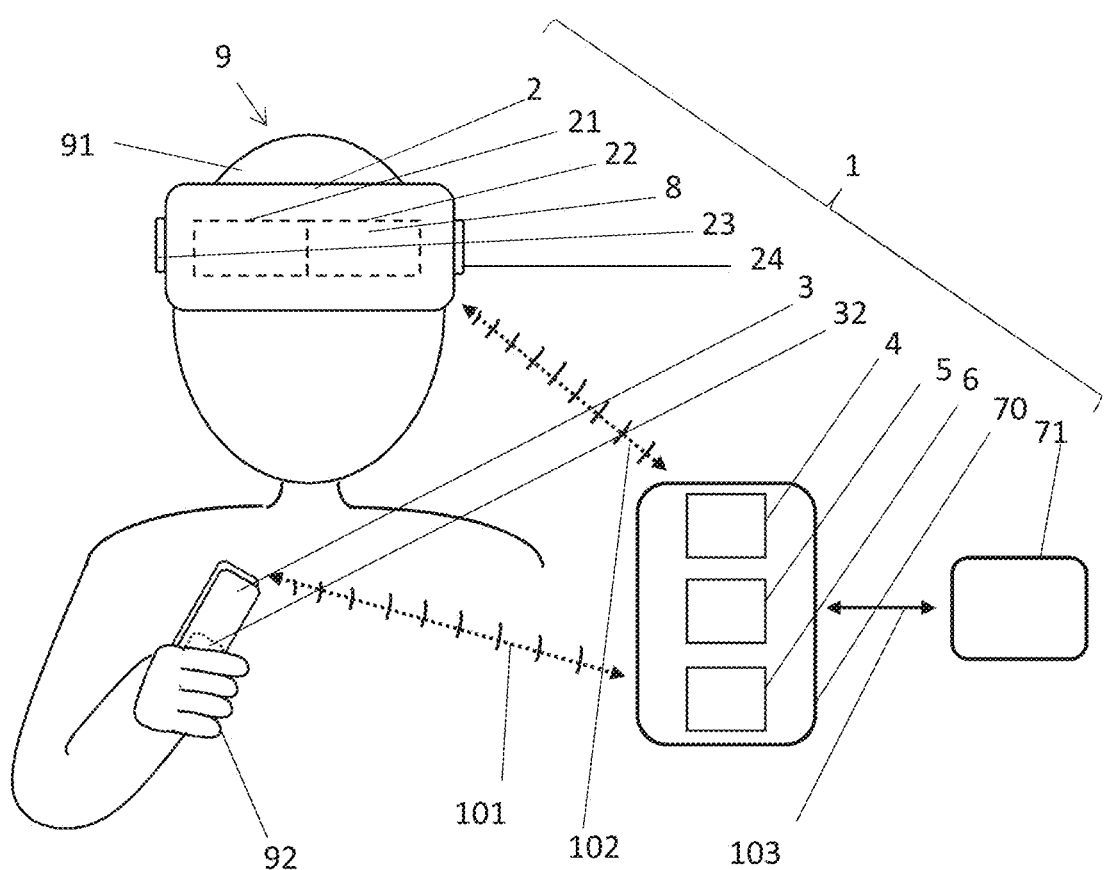
FIG. 1 shows a schematic view of a cognitive training system according to the invention.

FIG. 1 shows an embodiment of a cognitive training system 1 for providing a session containing one or more cognitive exercises.

The cognitive training system 1 comprises a head-mounted display (HMD) 2 for providing a stereoscopic image 8 to a user 9. The illustrated head-mounted display 2 is configured to provide a stereoscopic image by displaying two distinct images, one destined for the right eye, the other for the link eye, on two display surfaces 21, 22, each surface being positioned in front of one of the eyes when the user worn the HMD 2. The display surfaces 21, 22 can be provided by two physically distinct display units or, alternatively, by two virtually separated display surfaces of a same display unit.

The illustrated cognitive training system 1 also comprises a speaker 23, 24 for providing an acoustic stimulus or a sound to the user. Preferably, the cognitive training system 1 comprises a pair of speakers 23, 24, one speaker destined for the right ear, the other speaker for the links ear, so to provide both a monophonic or stereophonic stimulus and sounds. The speaker or the pair of speakers 23, 24 can be in form of a single or a pair of box-shaped loudspeaker (loud speaker enclosure or cabinet). Alternatively, the speaker or the pair of speakers can be a wearable speaker or a pair of wearable speakers, such as a single headphone or headphones 23, 24. Advantageously, the wearable speakers can be mounted on (or attachable to) the head-mounted display 2.

The illustrated cognitive training system 1 further comprises a haptic unit 32 for providing a haptic stimulus to the user, such as a vibration, a physical shock, an electrical shock, or a force acting on (a given portion of) the body of the user. The haptic unit can be configured to be located at, or near, a given portion of the body of the user. Alternatively, or complementarily, the haptic unit 32 can be mounted (or integrated) in a component of the cognitive training system, notably the head-mounted display 2, the speaker 24, 25, and/or the input device 3.

Alternatively, or complementarily, the haptic unit 32 can comprise (or can consist in) a mobile platform on which the user must stay during the cognitive exercise.

The cognitive training system 1 comprises an input unit 3 for acquiring inputs provided by the user. The input unit can be any device capable to collect an input that is physically, visually and/or acoustically provided by the user.

The input device can be configured to be located at a given, fixed position with respect to the user's environment. Alternatively, or complementarily, the input unit can be, or can comprise, a portable or wearable device, notably a hand-held device 3.

The cognitive training system 1 then comprises a controller 4 configured to acquire a sequence of input provided by the input unit 3 and to control the head-mounted display 2, the speaker 23, 24, and/or the haptic unit 32 to provide, sequentially, the one or more cognitive exercise of the session, e.g. by providing the related series of (stereoscopic) images (e.g. computer-generated imagery, CGI), a predefined or given acoustic stimulus or sounds and/or a predefined or given haptic stimulus being parts of, or associated with, the cognitive exercise.

Figure 2:
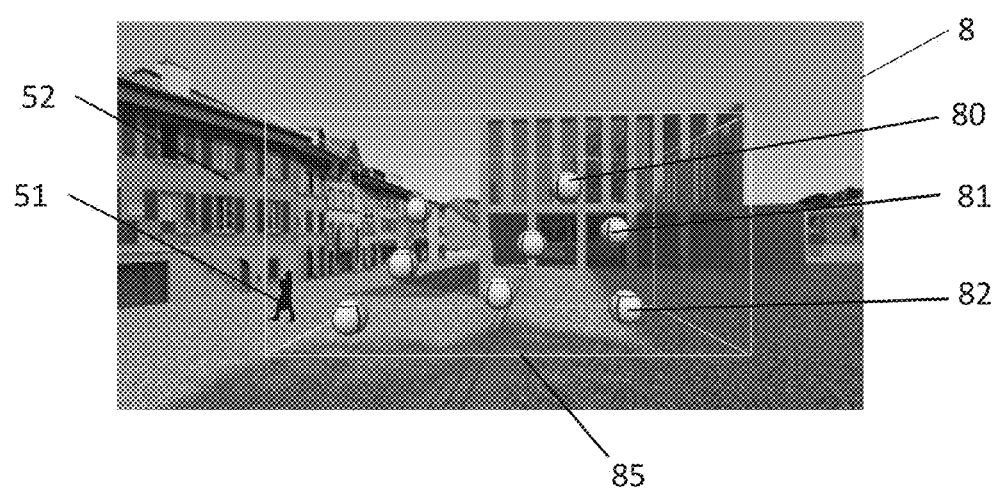
FIG. 2 shows an exemplary image of a cognitive exercise proposed to a user, by means of the cognitive training system of FIG. 1.

As illustrated in FIG. 2, the cognitive exercise relies on a tracking exercise where the user is prompt to track a sub-set of virtual objects 80, 81, 82 moving in a three-dimensional environment (i.e. stereoscopically displayed in movements a three-dimensional environment by means of the head-mounted display) according to predetermined rules of motion. Before the tracking exercise, and uniquely for an initial lapse of time, the subset of virtual objects to be tracked is identifiable, e.g. by means of a different colour and/or shape. After a given time interval, tracking exercise stops, i.e. the relative movement of all the virtual objects stops, and the user is prompted to select and/or indicate the virtual objects he/she was supposed to track.

During the tracking exercise, each virtual object is identical to another (e.g. same shape and same colour). The virtual object can take the form of an object whose tracking in the given dynamic activity provides a better anticipation and decision-making abilities, such as a soccer, basket, or football ban. Alternatively, the virtual object can take a form of (another) three-dimension solid object, such as a sphere, a cube, a star, etc.

The rules of motion permit to define the absolute and/or relative movements of each virtual object at any moment of time, i.e. the absolute and/or relative positioning of each virtual object within each (stereoscopic) image 8 being displayed on the head-mounted display. The rules of motion permits, notably, to define the initial position, a sequence of trajectories and/or the speed of each virtual object. The rules of motion can also permit to define (and synchronize) the starting and the stopping time of the movements of the virtual objects, as well as the virtual interactions between virtual objects (e.g. in case of virtual collisions).

The rules of motion can also consider a three-dimensional (evolution) space 85 in which the virtual objects are moving and/or car move. The rules of motion can also define and/or limit the movements of each virtual object according to a given evolution space 85, notably by a modification of a movement/trajectory of a virtual object approaching and/or meeting an external surface of the evolution space. The modification can thus comprise: a bounce, a random change of direction, deceleration, acceleration, and/or a combination thereof.

The evolution space 85 can take a form of a hexahedron (e.g. cube or a rectangular cuboid 85), a sphere or of another 3D object, notably to simulate and/or representing a field of game. The evolution space 85 be displayed, e.g. by means of edges, lines and/or vertex thereof.

The rules of motion can consist in (or can rely on) one or more mathematical formulas, one or more logical formulas, one or more geometrical forms, one or more conditional motions, random numbers, and/or a combination thereof.

The rules of motion can also control a temporary change of shape and/or of a colour of the sub-set of virtual objects to be tracked so as to indicate them to the user.

The cognitive exercise can also involve:
a displaying of a given three-dimensional background 52, and/or
a reproduction of a given acoustic stimulus, sounds or music; and/or
an applying of given haptic stimulus to the user.

A displaying of a given three-dimensional background 52 can be used to simulate and/or reproducing an environment correlated with the activity the user is implicated. Alternatively, the background can be used to visually isolating the user from the real environment.

The given three-dimensional background 52 can be predefined and/or defined by the cognitive training system 1. Alternatively, or complementarily, the cognitive training system lean be configured to permit the user to provide and/or select the given three-dimensional background within a database of backgrounds, e.g. by means of the input unit 3.

Preferably, the display unit or units are non-transparent units (i.e. the user cannot see through the display unit), so to provide a user a sensation of being physically present in the (computer-generated) non-physical world.

The reproduction of a given acoustic stimulus sounds or music can be used to simulate and/or reproduce an acoustical environment correlated with the activity the user is implicated. Alternatively, the reproduction can be used to acoustically isolate the user from the real environment.

The given acoustic stimulus, sound or music can be predefined and/or defined by the cognitive training system 1. Alternatively, or complementarily, the cognitive training system 1 can be configured to permit the user to provide and/or select the given acoustic stimulus, sounds or music within an acoustic database of acoustic stimulus, sounds and music, e.& by means of the input unit 3.

The given haptic stimulus can be used to simulate and/or reproduce a tactile feeling being correlated with the activity the user is implicated, such as a physical contact with an equipping and/or an accessory of a given activity.

Alternatively, or complementarily, the given haptic stimulus can produce a given orientation of (the surface of) the mobile platform on which the user must stay, e.g. so to reproduce an orientation of the evolution space 85.

The given haptic stimulus can be predefined and/or defined by the cognitive training system 1. Alternatively, or complementarily, the cognitive training system 1 can be configured to permit the user to generate and/or select the given haptic stimulus within a database of haptic stimulus, e.g. by means of the input unit 3.

Advantageously, the cognitive training system 1 is configured to provide a visual representation of the input provided by the user. In case of an input device providing a position, a direction and/or an orientation of the device (e.g. a hand-held pointing device 3), the cognitive training system 1 can be configured to display a virtual selector moving on the three-dimensional environment according to the input provided by the user. Moreover, the movement of a virtual selector can involve a visual modification of an object at which the virtual selector points.

The cognitive training system 1 further comprises a perturbation unit 5 configured to control the head-mounted display 2, the speaker 23, 24, the haptic unit 32, and/or the controller 4 to activate a perturbation 5. The perturbation (temporarily and/or sporadically) alters at least one of a visual, acoustic and haptic perceptions of the user. The perturbation unit determines the perturbation based on a random or pseudorandom quantity, e.g. relying on a pseudorandom number generator, on inputs, and/or on positions, directions and/or orientations of the input unit.

The perturbation can be, or can comprise, a virtual perturbation 51 altering the appearance of the virtual objects. The virtual perturbation can include one or more of:
an extraneous object (51);
a superposition of a random background (52) and/or a foreground image;
a (random) change of the background;
a (random) apparition and/or disappearance of the evolution space 85 and/or of the visual indicator of centre of the evolution space 85;
a (random) change of illumination, e.g. of at least a portion of one or more displayed (stereoscopic) images and/or of one or more of said virtual objects;
a (random) image noise, such as (random) variation of brightness or colour information, e.g. of at least a portion of one or more displayed (stereoscopic) images and/or of one or more of said virtual objects;
a simulation of visual vibrations, loss of orientation of the user, loss of equilibrium of the user, and/or of a physical shock;
a simulation of a human visual impairment or disturbance, e.g. due to a hypoglycaemia or hyperglycaemia, altitude sickness.

The perturbation unit 5 can be configured to (temporarily and/or sporadically) display a virtual perturbation in form of one or more extraneous object 51, each of the extraneous objects 51 being perceptively different from the mobile virtual objects the user must track. The extraneous object can take a form of a solid object, staying or moving on the three-dimensional environment according its own rules of motion, notably based on said random or pseudorandom quantity. Advantageously, the extraneous object can take a form of a human also (virtually) taking part of the given activity, such as a player, a judge, a spectator. Alternatively, or complementarily, the extraneous object can take a form of a solid element of the displayed background, such as a vehicle, a dog, a bird, etc.

Alternatively, or complementarily, the perturbation can be, or can comprise, an acoustical perturbation altering an acoustic perception of user, notably of the acoustic stimulus provided by the speaker during the cognitive exercise.

The perturbation unit can determine the acoustical perturbation based on the same random or pseudorandom quantity used for the virtual perturbation.

The acoustical perturbation can include one or more of:
a superposition of a background stimulus;
a (random) replacement of the given acoustic stimulus, sound or music by another one;
a (random) change of an acoustic volume of the given acoustic stimulus;
a (random) acoustic noise;
an acoustic shock;
a simulation of a physical shock or a human acoustic impairment or disturbance.

Alternatively, or complementarily, the perturbation can be, or can comprise, a physical perturbation altering a physical perception of the user.

The perturbation unit can determine the physical perturbation based on the same random or pseudorandom quantity used for the virtual and/or acoustical perturbation.

The haptic perturbation can include one or more of:
a (random) replacement of the given haptic stimulus by another one;
a vibration;
a physical shock;
an electrical shock;
a force acting on the user and causing a modification of the equilibrium of the user.

In particular, the haptic stimulus can produce a modification of the surface of the mobile platform on which the user has to stay. The modification permits, notably, to simulate and/or reproduce a modification of a surface on which the virtual objects are moving and/or of the evolution space 85.

The cognitive training system 1 is advantageously configured to assess a level and/or a modification in cognitive skills of the user.

The cognitive training system 1, notably the controller thereof, can thus be configured to assign an exercise score to the/each cognitive exercise and/or to the session. The exercise score can consist in (or can comprise): a digital label, a numerical value, a word, a sentence, a textual evaluation, an alphanumerical or graphical symbol, a sequence of alphanumerical or graphical symbols, and/or a combination thereof.

The exercise score can be determined, selected (within a finite list of predefined scores) and/or inferred based on inputs provided by the user during the cognitive exercise, notably based on an accuracy of the tracking of the sub-set of mobile virtual objects the user was asked to track.

The cognitive training system 1 is can also configured to provide one or more question exercises, advantageously during the same session, so to complementarily and robustly assess a level and or a modification in perceptual-cognitive abilities of the user.

In particular, a question exercise can be provided at the end of the session (i.e. after providing the one or more cognitive exercises) so to evaluate modifications in cognitive skills due to the cognitive exercises.

The cognitive training system 1, notably the controller 4, can be configured to provide a question exercise by:
prompting the user to answer to each questions of a group of questions; and
acquiring inputs (31) provided by the user by means of the input unit (3) for evaluating a correctness and/or an accuracy of the answer.

The group of questions comprises one or more questions, each question being a visually and/or an acoustically question being prompted to the user by means of the head-mounted device 2 and/or the speaker 23, 24 of the system. Preferably, each question of the group is selected between and/or inferred from a question database collecting a plurality of questions.

The group can comprise one or more of:
a mathematical/logical question relying on a mathematical or logical operation being acoustically and/or visually prompted to the user, notably comprising a displaying of one or more solid numbers and/or of one or more solid mathematical or logical operations in the three-dimensional environment of the virtual objects;
an appearance question comprising a displaying of a set of solid objects in the three-dimensional environment of the virtual objects, wherein said set comprises at least two identical-shaped objects and a different-shaped object;

a position question comprising a displaying of a set of solid objects in the three-dimensional environment, wherein each object (randomly) moves from an initial position to a final position being spatially different from the initial one.

Moreover, the cognitive training system 1, notably the controller 4, can be configured to assign a question score to the question exercise and/or to the session based on the correctness and/or the accuracy of the answer provided by the user in response to the questions. The question score can consist in (or can comprise): a digital label, a numerical value, a word, a sentence, a textual evaluation, an alphanumerical or graphical symbol, a sequence of alphanumerical or graphical symbols, and/or a combination thereof.

The exercise and/or the question score can be used to provide a new session for further improving the cognitive skill of the user. The new session can comprise at least a new cognitive exercise, a new question exercise and/or a new perturbation being different from the one or ones of the assessed sessions (initial session).

The new session can be determined by means of an expert analysing one or more parameters of the cognitive exercise, the question exercise and of the perturbation as well as the assigned exercise score and question score.

The expert can further take into consideration the time investment provided by the user, e.g. the number and/or the duration of cognitive exercises within a given period (week/month) so to determine the new session as well as to an optimal frequency and duration of training.

The expert can further take into consideration a progression rate of the user, the frequency of training, background information of the users (gender, age, type of athletes) and internal metrics inferred by input provided during the cognitive and/or question exercises.

The expert can then configure the cognitive training system 1 to provide the new session by means of the input device 3 or by means of a remote device 71 (e.g. a server) being connected or connectable to the controller 4 and to the perturbation unit 5 by means of a data link 103.

Figure 3:
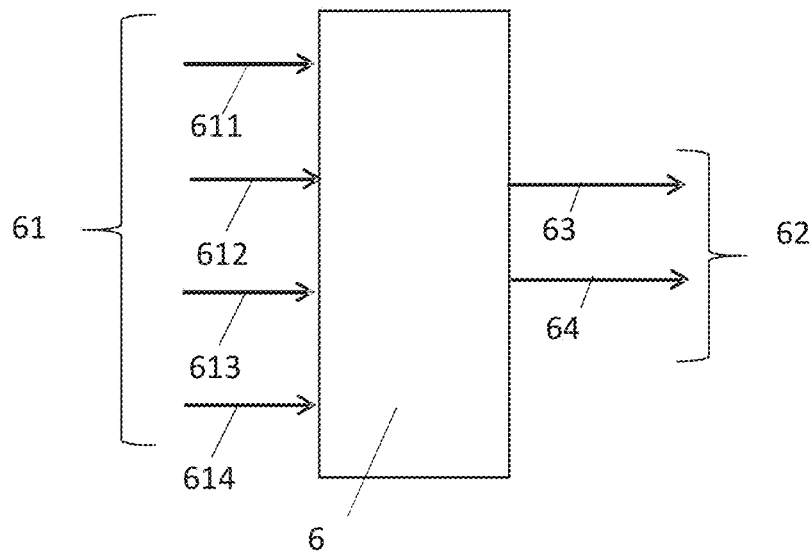
FIGS. 3-4 shows a self-learning unit for the system of FIG. 1, in mode of operation (FIG. 3) and in training mode (FIG. 4).

Alternatively, or complementarily, as illustrated in FIG. 3, the cognitive training system 1 can comprises a self-learning machine 6 being trained (i.e. in mode of operations), in response of an input dataset 61, to provide (infer):
 a new cognitive exercise and/or
 a new question exercise, and/or
 a new perturbation.

By the term new, it is mean a thing being distinct, different from the current one.

The input dataset 61 comprises at least a parameter 611 describing the session, the exercise score 612, the question score 613, and/or the inputs 614 provided by the user, notably during the session.

The parameter(s) 611 describing the session can be one or more parameters describing the one or more cognitive exercise of the session. In particular, the parameter(s) can described and/or determine the rules of motion used for the cognitive exercise, such as the number of moving virtual objects, the number of virtual objects to be tracked, the speed of the virtual objects, the duration of the cognitive exercise, the initial and/or final position of the virtual objects, the virtual interactions between virtual objects, the evolution space, and/or the used mathematical formulas, the geometrical forms, the conditional motions and random numbers.

The parameter(s) 611 can also indicate and/or represent the time investment provided by the user, e.g. the number and/or the duration of cognitive exercises and/or sessions within a given period (week/month).

The parameter(s) 611 can be one or more parameter describing the one or more question exercises provided with the session, such as the type of question (e.g. the prompted mathematical/logical question, appearance question and/or position question).

The input dataset 61 can also comprises at least an indicator describing a progression rate of the user, the frequency of training, background information of the users (gender, age, type of athletes) and internal metrics inferred by input provided during the cognitive and/or question exercises.

The self-learning machine 6 (in mode of operation) can be thus operationally connected to the input unit 3, the controller 4 and/or the perturbation unit 5; so to provide an output dataset 62 permitting to:
 configure the controller 4 to provide a new cognitive exercise (notably a new rule of motion) and/or a new question exercise, and/or to
 configure the perturbation unit 5 so to provide a new perturbation (e.g. a new type of perturbation and/or new rules of motion).

Figure 4:
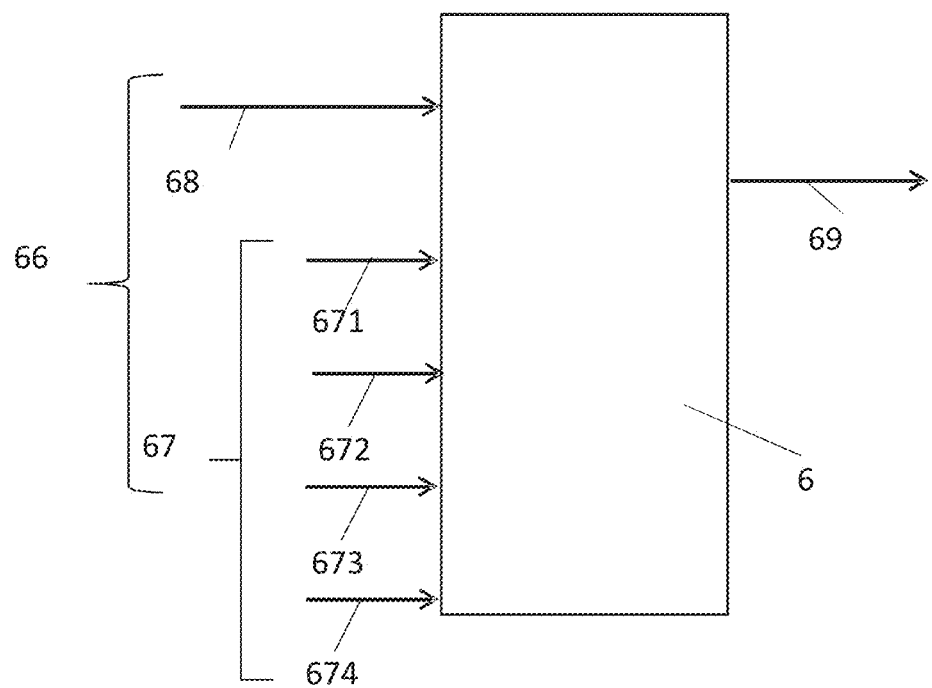

As illustrated in FIG. 4, the self-learning machine 6 can be trained (i.e. to infer internal parameters) by building a reference input dataset 66 generated by pairing:
 reference data 67 collected by providing a cognitive exercise to a reference user with
 a reference assessment 68 indicating and/or representing a measured and/or observed improvement of the cognitive skills of the reference user.

The reference data 67 can comprise at least a parameter 671 describing a reference session, a reference exercise score 672, a reference question score 673, and/or a reference inputs 674 provided by reference user.

The reference data 67 (notably by means of the parameter or parameters 671) can comprise an indicator and/or a parameter describing the reference session, e.g. the rules of motion used for the cognitive exercise, notably the number of moving virtual objects, the number of virtual objects to be tracked, the speed of the virtual objects, the duration of the cognitive exercise, the initial and/or final position of the virtual objects, the virtual interactions between virtual objects, the evolution space, and/or the used mathematical formulas, the geometrical forms, the conditional motions and random numbers.

The reference data 67 can also indicate and/or represent the time investment provided by the reference user, e.g. the number and/or the duration of cognitive exercises within a given period (week/month).

The reference data 67 can also describe the one or more question exercises provided with the reference session, such as the type of question (e.g. the prompted mathematical/logical question, appearance question and/or position question).

The reference data 67 can also comprise at least an indicator describing a progression rate of the reference user(s), the frequency of training, background information of the reference user(s) (e.g. gender, age, type of athletes) and internal metrics inferred by input provided during the cognitive and/or question exercises.

The self-learning machine can be configured to implement machine learning based algorithms, such as a neural network, a statistical algorithm, a gaussian process, a k-nearest neighbour approach, a decision tree, a random forest regressor, a nearest neighbours, and/or on random forest.

The output dataset 62 can also provide an indication of an optimal frequency and duration of new and/or new sessions.

The self-learning machine 6 in mode of operation and in training mode can be a same machine (capable to operate in both the modes), or two distinct machines. In this last case, the inferred parameter of the self-learning machine 6 in training mode can be provided to the self-learning machine 6 in mode of operation to enable them.

Each of the controller 4, the perturbation unit 5 and the self-learning machine 6 can comprise or can consist in: an electronics circuits, a list of software instructions executable on a dedicated processor or on a general-purpose processor of the system 1 that can be temporarily allocated for executing specific functions of the controller 4, the perturbation unit 5 and the self-learning machine 6.

The controller 4, the perturbation unit 5 and the self-learning machine 6 (in mode of operation) can be part of a local device 70 being linked to the head-mounted device and/or to the speaker and/or to the input device by means of one or more data ink 101, 102, 103. The data link can be wired and/or wireless data link.

Each of the self-learning machine 6 in training mode, the question database, the database of backgrounds, the acoustic database, and the database of haptic stimulus can be part of the local device 70 or of the remote device, such as a server 71 being connected or connectable to the controller 4, the perturbation unit 5 and to the self-learning machine 6 in mode of operation (e.g. to the local device 70) by means of a data link 103, e.g. relying on a (LAN/WAN) data network.

LIST OF REFERENCE NUMERALS

1 Cognitive training system
2 Head-mounted display
21 Right display
22 Left display
23 Right ear
24 Left ear
3 Input unit
31 Input
32 Haptic unit
4 Controller
41 Exercise parameters
42 User profile
5 Perturbation unit
50 Disturbance parameters
51 Extraneous objects
52 Background
6 Self-learning machine
61 Input dataset
611 Parameter(s) of the cognitive and/or question exercise
612 Exercise score
613 Question score
614 Parameter(s) of the perturbation
62 Output dataset
63 Parameter(s) of the cognitive and/or question exercise
64 Parameter(s) of the perturbation
66 Reference input dataset
67 Reference cognitive exercise
671 Parameter(s) of the cognitive and/or of question exercise and/or of the perturbation
672 Reference Exercise score
673 Reference question score
674 Reference inputs
68 Indication of a Skill/ability improvement
69 Inferred (self-learning) machine parameters
70 Local device
71 Remote device server
8 (Stereoscopic) image
80-82 Virtual objects
85 Evolution space
9 User
91 Head
92 Hand
101 (wireless) Data link
102 (Wireless) Data link
103 (wired/wireless) Data link

The invention claimed is:

1. A cognitive training system for providing a cognitive exercise, the cognitive training system comprising:
 a head-mounted display for providing a stereoscopic image to a user;
 a controller configured to control said head-mounted display to provide the cognitive exercise by
 displaying virtual objects moving in a three-dimensional environment according to predetermined rules of motion and by,
 acquiring inputs provided by the user by means of an input unit; and
 a perturbation unit configured to control said head-mounted display and/or said controller to activate a virtual perturbation altering the appearance of said virtual objects,
 wherein the perturbation unit determines the virtual perturbation based on a random or pseudorandom quantity,
 wherein the controller is configured to provide the cognitive exercise by; prompting the user to track one or a sub-set of said virtual objects, and by acquiring a tracking decision of the user by means of the input unit.

2. The cognitive training system of claim 1, wherein the virtual perturbation includes one or more of:
 an extraneous object;
 a superposition of a random background and/or a foreground image;
 a random change of illumination;
 a random image noise;
 a simulation of visual vibrations, loss of orientation of the user, loss of equilibrium of the user, a physical shock, a human visual impairment or disturbance.

3. The cognitive training system of claim 1, further comprising a speaker for providing an acoustic stimulus to the user, wherein
 the perturbation unit is also configured to control said speaker to activate an acoustical perturbation altering a perception of said acoustic stimulus,
 wherein the perturbation unit determines the acoustical perturbation based on a random or pseudorandom quantity.

4. The cognitive training system of claim 3, wherein the acoustical perturbation includes one or more of:
 a superposition of a background stimulus;
 a random change of an acoustic volume of the acoustic stimulus;
 a random acoustic noise;
 an acoustic shock;
 a simulation of a physical shock or a human acoustic impairment or disturbance.

5. The cognitive training system of claim 1, further comprising
 a haptic unit for providing a haptic stimulus to the user, wherein
 the perturbation unit is also configured to control said haptic unit to activate a physical perturbation altering the haptic stimulus,
 wherein the perturbation unit determines the haptic perturbation based on a random or pseudorandom quantity.

6. The cognitive training system of claim 5, wherein the haptic perturbation includes one or more of:
   a vibration;
   a physical shock;
   an electrical shock;
   a force acting on the user and causing a modification of the equilibrium of the user.

7. The cognitive training system of claim 1, wherein
   the controller is configured to assign an exercise score to the cognitive exercise based on inputs provided by the user.

8. The cognitive training system of claim 1, wherein cognitive training system is also configured to provide a question exercise to the user; and wherein
   the controller is configured to provide the question exercise by:
      acoustically and/or visually prompting the user to answer to a question, and by
      acquiring inputs provided by the user by means of the input unit.

9. The cognitive training system of claim 8, wherein
   the controller is configured to assign a question score to the question exercise based on the inputs provided by the user.

10. The cognitive training system of claim 1, further comprising
    a self-learning machine being operationally connected to the input unit, the controller and/or the perturbation unit; the self-learning machine being trained so, in response of an input dataset, to provide an output dataset permitting to:
    configure the controller to provide a new cognitive exercise and/or a new question exercise, and/or to
    configure the perturbation unit so to provide a new virtual, acoustical, or haptic perturbation;
    wherein the input dataset comprises: at least a parameter describing the cognitive exercise and/or the question exercise, the exercise score, the question score, and/or the inputs provided by the user.

* * * * *